United States Patent [19]

Jones et al.

[11] Patent Number: 6,005,566
[45] Date of Patent: Dec. 21, 1999

[54] ASPECT AND STYLE ELEMENTS OF AN IMPROVED GRAPHICAL USER INTERFACE

[75] Inventors: Jeremy A. Jones, Arlington; Neil L. Mayle; Paige K. Parsons, both of Cambridge; Andrew L. M. Shalit, Somerville; William W. St. Clair, Jr., Brighton, all of Mass.; Oliver W. Steele, Palo Alto, Calif.; Steven H. Strassmann, Cambridge; Derek R. White, Reading, both of Mass.

[73] Assignee: Apple Computer, Inc., Cupertino, Calif.

[21] Appl. No.: 08/934,929

[22] Filed: Sep. 22, 1997

Related U.S. Application Data

[63] Continuation of application No. 08/591,986, Jan. 29, 1996, abandoned, which is a continuation of application No. 08/246,319, May 19, 1994, abandoned.

[51] Int. Cl.$^6$ .................................................. G06F 15/00
[52] U.S. Cl. ............................................................ 345/333
[58] Field of Search ................................ 345/433, 326, 345/333, 334, 335, 339

[56] References Cited

U.S. PATENT DOCUMENTS

| | | | |
|---|---|---|---|
| Re. 32,632 | 3/1988 | Atkinson | 340/709 |
| 4,622,545 | 11/1986 | Atkinson | 340/747 |
| 4,931,783 | 6/1990 | Atkinson | 340/710 |
| 5,272,769 | 12/1993 | Strnatka et al. | 395/353 |
| 5,339,391 | 8/1994 | Wroblewski et al. | 395/157 |
| 5,473,742 | 12/1995 | Polyakov et al. | 395/142 |
| 5,490,246 | 2/1996 | Brotsky et al. | 395/161 |

OTHER PUBLICATIONS

OOPSLA '87, Conference on Object Oriented Programming, Systems Languages and Applications, Orlando, Fl., USA, Oct. 4–8, 1987.

vol. 22, No. 12, ISSN 0362–1340. Sigplan Notices, Dec. 1987 pp. 287–294, Alexander, J. Painless Panes for Smalltalk Windows.

Guide to MacApp Tools, Developer Technical Publications, Apple Computer, Inc. 1992, pp. 1–162.

Languages for Developing User Interfaces, A Component Architecture for Personal Computer Software, Smith et al., pp. 31–56, 1992.

*Primary Examiner*—Phu K. Nguyen
*Attorney, Agent, or Firm*—Cesari and McKenna, LLP

[57] ABSTRACT

A graphical user interface comprises aspect and style elements for controlling the type of information associated with objects displayed on a display screen of a computer system when browsing through the objects. The aspect element controls the particular type of information displayed for an object on a portion of a window, called a pane, while the style element controls the types of information displayed for all objects within that pane.

16 Claims, 9 Drawing Sheets

□ Online-Insultant ▬▬▬ Classes ▬▬▬

- ❖ Class <QDGlobals>
- ❖ Class <SpeechChannel>
  - ▲ DisposeSpeechChannel (chan :: <SpeechChannel>) = >small-integer>
  - ▲ SpeakText (chan :: <SpeechChannel>, textBuf :: <string>, textBytes :: <integer>) = > result ::
    ➧ speak-string (string :: <string>, #key synchronous;)
  - ▲ SpeechChannelRecord$data (object :: <SpeechChannel>, index :: <small-integer>
  - ▲ SpeechChannel Record$data-setter (object :: <SpeechChannel>, index :: <small-integer>, new-
- ❖ define interface
    $include "memory.h",
    name-mapper: minimal-name-mapping-with-structure-prefix,
    define: {"SystemSevenOrLater"},         // for Gestalt
    import: {"DisposePtr"};
  end interface;
- ❖ Class <VoiceSpec>
- ❖ Class <basic-machine-pointer>
- ❖ Class <object>
- ❖ Class <statically-typed-pointer>

□ Class<basic-machine-pointer>

<object>    <basic-machine-pointer>    ❖ <alien-pointer> ->
                                       ❖ <dynamically-linked-function-pointer>
                                       ❖ <statically-typed-pointer> ->

ASPECT AND STYLE ELEMENTS OF AN IMPROVED GRAPHICAL USER INTERFACE

This is a continuation of U.S. patent application Ser. No. 08/591,986, filed on Jan. 29, 1996, now abandoned, which is a continuation of U.S. patent application Ser. No. 08/246,319, filed on May 19, 1994, now abandoned.

CROSS-REFERENCE TO RELATED APPLICATIONS

This invention is related to copending U.S. Patent Application Serial No. (P1332), titled STATUS INDICATORS OF AN IMPROVED GRAPHICAL USER INTERFACE, filed on May 19, 1994 and assigned to the assignee of the present invention. The invention is also related to U.S. patent application Ser. No. 08/050,510, titled INTERACTIVE USER INTERFACE, filed on Apr. 20, 1993 and assigned to the assignee of the present invention, which application is hereby incorporated by reference as though fully set forth herein.

FIELD OF THE INVENTION

This invention relates to interactive graphical user interfaces for computer systems and, more specifically, to user interface elements for is controlling the type of information associated with objects that are displayed on a computer display screen.

BACKGROUND OF THE INVENTION

Graphical user interfaces are typically based on bit-mapped graphic display technology that employs iconic (pictorial) representations, multi-font typographic-style text and other art work on a display screen of a computer system. These interfaces include a window environment that configures the screen to resemble a graphical display for a user to enter or view information. Specifically, an application program executing on the computer system presents the information to the user through a window by drawing images, graphics or text within the window region. The user, in turn, communicates with the application by "pointing" at objects in the window region with a cursor that is controlled by a hand-operated pointing device, such as a mouse.

Transient "pop-up", "pull-down" and "hierarchical" menus are examples of user interface elements that list command selections that are available to a user at all times, regardless of what else may be displayed on the screen. For example, there is no need to close a document and return to a main menu screen in order to select and issue commands from a menu. The menus can be activated and commands selected merely by pointing to them with the cursor-controlled mouse. That is, the commands may be issued by actuating the mouse to move the cursor onto or near the command selection and pressing and quickly releasing, i.e., "clicking", a button switch on the mouse.

These menus may be manifested in a variety of ways, including direct access menus which show all possible choices on a window, such as with a panel of buttons, and taxonomic menus which classify a domain hierarchy and allow the user to navigate through it. In many situations it is not necessary for a menu to remain permanently visible on the display screen and it can thus be "popped-up" on the screen when required. Typically, the button on the mouse is pressed to display the menu, which is painted on the screen near the cursor position. When the button is released, the menu disappears. Menu selection is achieved by pointing the cursor at the desired item with the mouse, which visually shades the selected item.

The pop up menu is a convenient way to keep frequently used commands and information accessible without occupying space on the window screen. Alternately, several different menus can be provided by buttons on a menu bar extending across the top of the window screen which, when selected by the mouse, display its menu; these are called pull-down menus. Typically, these menus remain drawn only while the mouse button is depressed.

A hierarchical menu is a menu that has a submenu attached to one or more of its menu items. These submenus provide additional choices to a user without consuming extra space in the menu bar. Typically, a menu item of a pull-down menu is the title of the attached submenu.

Graphical user interfaces are exemplified by the Finder application software system used in the Macintosh® series of computers manufactured by Apple Computer, Inc. of Cupertino, Calif. An aspect of that software system is described in U.S. Pat. 4,931,783, which is hereby incorporated by reference as through fully set forth herein. That patent describes how to manipulate and control the functions available from the Finder system though the use of pull-down menus. The details of how to implement such a system, as well as other Finder functions, are described in a volume of the publication "Inside Macintosh", published by Addison-Wesley, titled "Macintosh Toolbox Essentials", which volume is hereby incorporated by reference as though fully set forth herein.

Another example of a popular software system that provides a graphical user interface is the Windows® operating system, which is commercially available from Microsoft Corporation. The present invention is applicable to all such systems and is concerned with accessing user interface elements via a control device, such as a mouse, to perform operating system or program functions associated with information browsing.

Object-oriented programming is a paradigm for designing and implementing software programs. Fundamentally, object-oriented programming defines and packages objects, where an object consists of a data structure together with the operations available for that structure. Once such objects have been defined, it is possible to build a program as a simple sequence of processes to be performed on specified instances of these objects. An integral part of object definition is the ability to create new, more elaborate objects as enhancements of those previously defined.

Frequently, a user may want to view different types of information associated with these objects. For example, to examine the contents of a particular object such as a file folder, the user may "open" that file folder object. Yet, when "opening" a document, the user may actually desire to start the application that created the document prior to displaying the contents of that document in the context of that application.

Opening an object in the context of a prior art navigation or "browsing" tool typically means expanding the contents of that object to display a predetermined type of information about that object. To vary the type of information displayed about that object, however, a variety of tools must be utilized that provide sorting and selection of the types of information desired by the user. For example, after selecting an object, if the user desires to look at, e.g., the classes associated with the object, the user must retrieve a menu to select a class browser. Upon selecting a class of interest, if the user wants to examine the methods associated with that class, a method browser must be utilized. It is clear that such an approach is time consuming and inefficient.

Alternatively, another prior art browser enables a user to examine multiple views of objects in various areas of a window on a screen. However, the information displayed in each window area cannot be varied, thus rendering this tool static and not dynamically-configurable. That is, the tool may always allow a user to view the classes of an object in one window area, the methods associated with a selected class in another window area and the source code of a selected method in still yet another window area of the screen.

Accordingly, it is among the objects of the present invention to provide an interactive graphical user interface having the capability of varying the meaning of "opening" an object depending upon the type of information the user desires.

Another object of the present invention is to provide an interactive graphical user interface having the capability to flexibly display various types of information associated with an object.

SUMMARY OF THE INVENTION

Briefly, an improved graphical user interface comprises novel aspect and style elements for controlling the type of information associated with objects displayed on a display screen of a computer system when browsing through these objects. Specifically, the aspect element controls the type of information displayed for each object, i.e., its "aspect", on a portion of a window, called a pane, while the style element controls the types of information displayed for all objects within that pane. In accordance with the invention, these novel user interface elements provide a customizable browser framework to a user.

More specifically, aspects provide links between an object and its types of information or other types of objects that the user may wish to examine when invoking the customizable browser framework. These types of information may include any media or data type, such as sound, graphics, text and video, while the types of objects may include specific instances of these media or data types. For example, upon selecting a particular object, such as a vehicle, the user may wish to see a picture of a particular model of that vehicle, the options available for that model and a description of a particular available option. The user interface elements described herein allow the user to view any or all of these aspects in a fast and efficient manner. As described further herein, the aspect element includes a default aspect that may be specified by the user to control a particular type of information about the object for display when invoking the browser.

On the other hand, styles allow the user to define the type of information initially displayed for all objects "opened" on the pane using the browser. This information may constitute aspects of the objects at any level of nesting; accordingly, styles provide collections of mappings between objects and their "default aspects". As described further herein, the user may configure the pane to any desired "style", thereby changing the objects and aspects appearing in that pane. Moreover, the style element may be utilized to display more than one type of information about a single type of object or it may be used to display different information about different types of objects.

The aspects of objects and styles of panes displayed on the screen are preferably determined on a pane-by-pane basis by retrieving respective aspect and pane style hierarchical menus from a pull-down or pop-up menu. Each of these hierarchical menus are user interface elements that provide a list of available entries, including those that are currently selected; these currently selected entries are preferably designated by check marks or other inscription adjacent to the entries. Specifically, the invention provides user interface mechanisms for replacing an existing aspect and/or adding a new aspect for display.

In addition to the available aspect entries, the aspect menu includes a default entry section for specifying a default aspect of an object for display in the active pane. The default entry section facilitates resetting of all the objects displayed in a pane to their default aspects specified by the selected style after the user has overridden that default. Overriding an aspect only changes the aspect shown directly beneath the selected object; all other displayed objects exhibit the default aspects for their styles unless they too are explicitly overridden by selecting a new value from the aspect menu. In accordance with the invention, the default entry section may be configured to display (i) a single aspect for all selected objects in the pane, (ii) multiple aspects for all selected objects in the pane or (iii) different aspects for some of the selected objects in the pane.

The selected aspects are preferably stored in a data structure located within a user visible object, while the selected styles are preferably stored in a data structure located with a pane object. The contents of these data structures determine which aspects and styles will be displayed in the pane; they are also used to determine the appropriate commands to send to the window manager, which then displays the pane.

Advantageously, the invention described herein allows a user to leverage relationships between objects of a program using the customizable browser framework and, thus, establish paths for investigating the contents of those objects in a sensible manner. For example, the user can configure the elements of the invention to view various objects of a program as a tree of related classes, protocols, or definitions and comments, thereby enabling the user to examine these "aspects" of the objects, one level at a time, throughout the tree.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
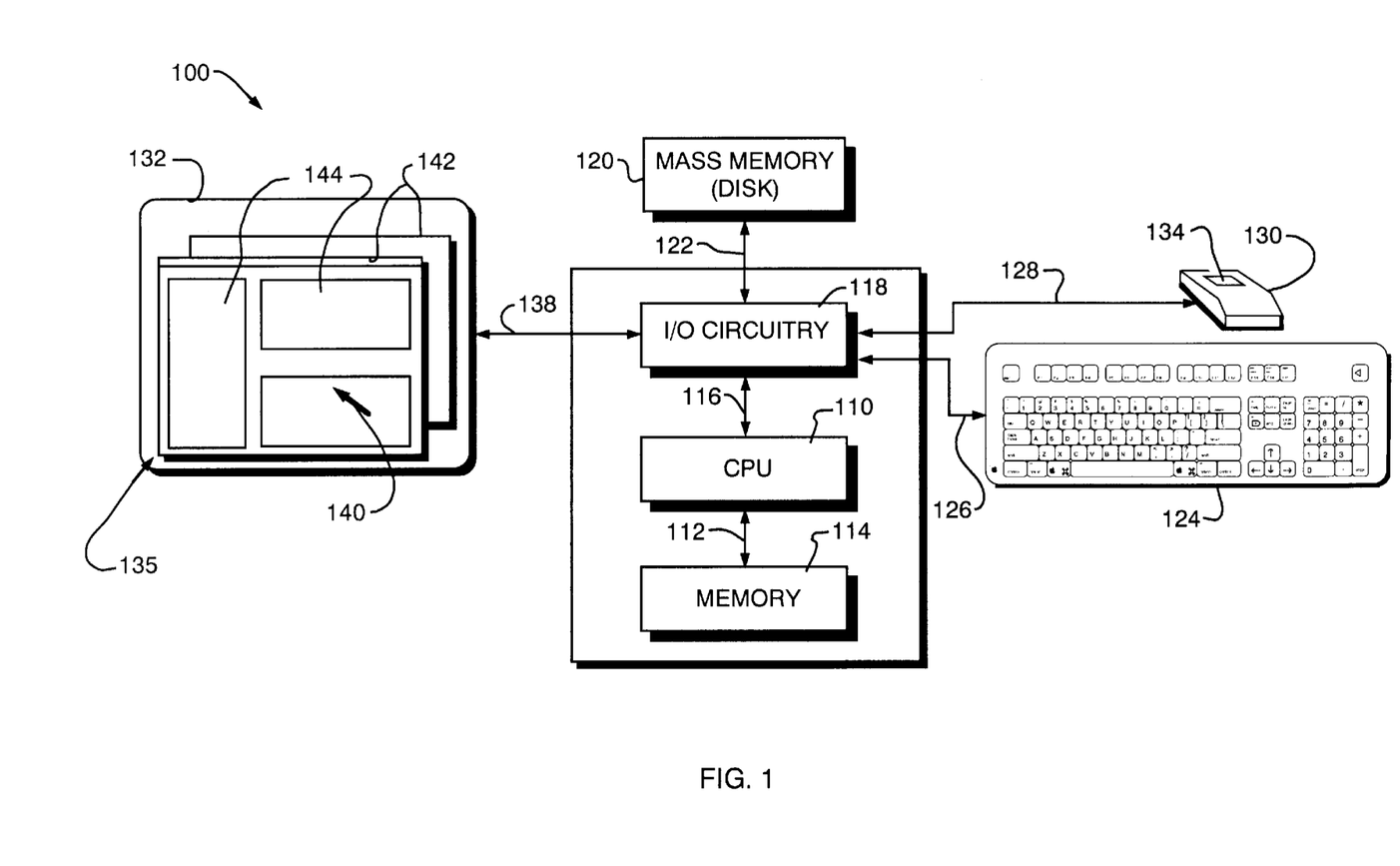
FIG. 1 is a block diagram of a computer system, such as a personal computer system, on which the invention may advantageously operate.

FIG. 1 illustrates a computer system 100 comprising a central processing unit (CPU) 110 coupled between a memory 114 and input/output (I/O) circuitry 118 by bidirectional buses 112 and 116. The memory 114 typically comprises random access memory (RAM) for temporary storage of information, including an application program (not shown), and read only memory (ROM) for permanent storage of the computer's configuration and basic operating commands, such as portions of an operating system (not shown). As described further herein, the application program and operating system interact to control the operations of the CPU 110 and computer system 100.

The I/O circuitry 118 is, in turn, connected to a mass storage unit 120, such as a disk drive, via a bidirectional bus 122 and to cursor control devices, such as a keyboard 124 (via cable 126) and a mouse 130 (via cable 128). A conventional display monitor 132 having a display screen 135 is also connected to I/O circuitry 118 via a cable 138. Specifically, the I/O circuitry 118 receives information, such as control and data signals, from the mouse 130 and keyboard 124, and provides that information to the CPU 110 for storage on the mass storage unit 120 or for display on the screen 135. It is to be understood that the I/O circuitry contains the necessary hardware, e.g., buffers and adapters, needed to interface with the mouse, keyboard and display monitor.

The mouse 130 typically contains at least one button switch 134 operated by a user of the system. A cursor 140 is displayed on the screen 135 and its position is controllable via the mouse 130 or the keyboard 124, as is well known. An example of the mouse 130 is shown and described in U.S. Pat. No. Re. 32,632, which patent is hereby incorporated by reference as though fully set forth herein.

The computer system 100 is preferably a personal computer of the Macintosh® series of computers sold by Apple Computer, Inc., although the invention may also be practiced in the context of any computer. These computers have resident thereon, and are controlled and coordinated by, operating system software, such as the Apple® System/7® operating system.

A window environment is typically displayed on the screen 135. In accordance with an aspect of the invention described herein, the window environment includes windows 142, each of which may contain panes 144, with each pane covering a portion of a window 142. The window environment is generally part of the operating system software that includes a collection of utility programs for controlling the operation of the computer system 100. The operating system, in turn, interacts with an application program to provide higher level functionality, including a direct interface with the user. Specifically, the application program makes use of operating system functions by issuing a series of task commands to the operating system which then performs the requested task. For example, the application program may request that the operating system display certain information on the panes 144 of the display screen 135 for presentation to the user.

The invention herein features, along with these windows and panes, the provision of new user interface elements, such as menus and their entries, which, when invoked, cause actions to take place that enhance the ability of a user to interact with the computer system. This new behavior of the system is brought about by the interaction of these elements with a series of system software routines associated with the operating system. These system software routines, in turn, interact with the application program to create the windows and panes, and manage the new menus, as described further herein.

Figure 2:
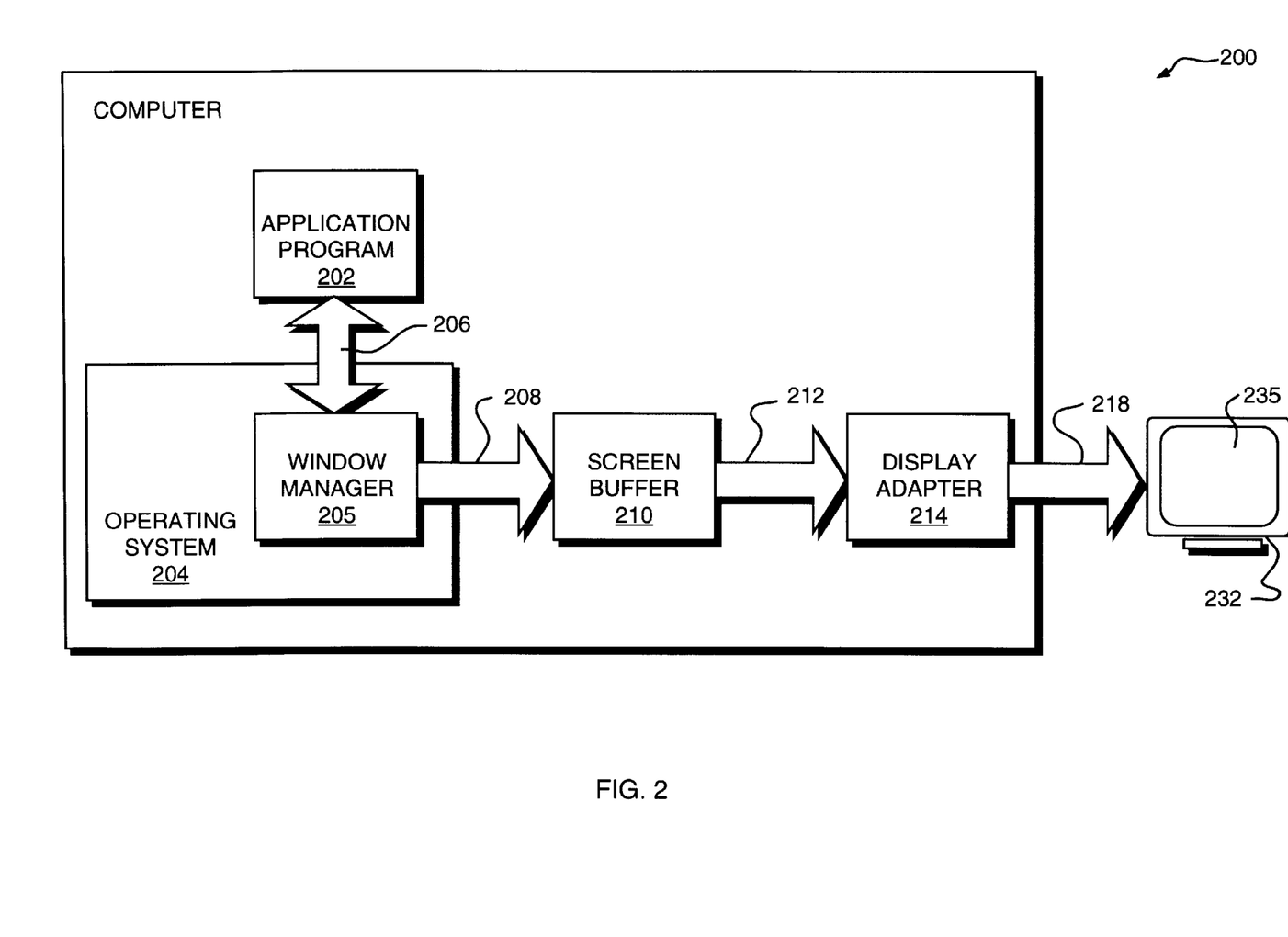
FIG. 2 is a block diagram showing the relationship of an operating system, an application program, a screen buffer and a display screen of the computer system of FIG. 1.

FIG. 2 is a schematic illustration of the interaction of an application program 202 and an operating system 204 of a computer system 200, which is similar to, and has equivalent elements of, the computer system 100 of FIG. 1. The application program 202 and the operating system 204 interact to control and coordinate the operations of the computer 200 and their interaction is illustrated schematically by arrow 206. In order to display information on a screen display 235, application program 202 generates and sends display commands to a window manager program 205 of the operating system 204. The window manager program 205 stores the information directly (via arrow 208) into a screen buffer 210.

The window manager 205 is a system software routine that is generally responsible for managing the window that the user views during operation of the application program; the application program is generally responsible for managing the panes. That is, it is generally the task of the window manager to keep track of the location and size of the window and window areas which must be drawn and redrawn in connection with elements of the improved graphical user interface of the present invention. Further details relating to the window manager are provided in the aforementioned "Inside Macintosh" publication "Macintosh Toolbox Essentials".

Under control of various hardware and software in the system, the contents of the screen buffer 210 are read out of the buffer and provided, as indicated schematically by arrow 212, to a display adapter 214. The display adapter contains hardware and software (sometimes in the form of firmware) which converts the information in the screen buffer 210 to a form which can be used to drive a display screen 235 of a monitor 232 which is connected to display adapter by cable 218.

In a preferred embodiment, the invention described herein is implemented in an object-oriented dynamic programming language, such as Common Lisp, using object-oriented programming (OOP) techniques. The Common Lisp language is well-known and many articles and texts are available which describe the language in detail. In addition, Common Lisp compilers are available from several vendors. Accordingly, for reasons of clarity, the details of the Common Lisp language and the operation of the Common Lisp compiler will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real world entity in terms of its characteristics, which can be represented by the data elements, and its behavior, which can be represented by its data manipulation functions. In this way, objects can model concrete things like people and computers, while also modeling abstract concepts like numbers or geometrical designs.

Objects are defined by created "classes" which act as templets that instruct the compiler how to construct an actual object. A class may, for example, specify the number and type of data variables and the steps involved in the functions which manipulate the data.

The principle benefits of OOP techniques arise out of three basic principles: encapsulation, polymorphism and inheritance. More specifically, objects can be designed to hide, or encapsulate, all, or a portion of, its internal data structure and internal functions. Polymorphism is a concept which allows objects and functions which have the same overall format, but which work with different data, to function differently in order to produce consistent results. Inheritance on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. The creation of a new subclass which has some of the functionality (with selective modification) of another class allows software developers to easily customize existing code to meet their particular needs.

In accordance with the invention, the window and its panes are "objects" created by the application program to communicate with the window manager, which is preferably an object-oriented program. The interaction between an application program and a window manager is illustrated in greater detail in FIG. 3.

Figure 3:
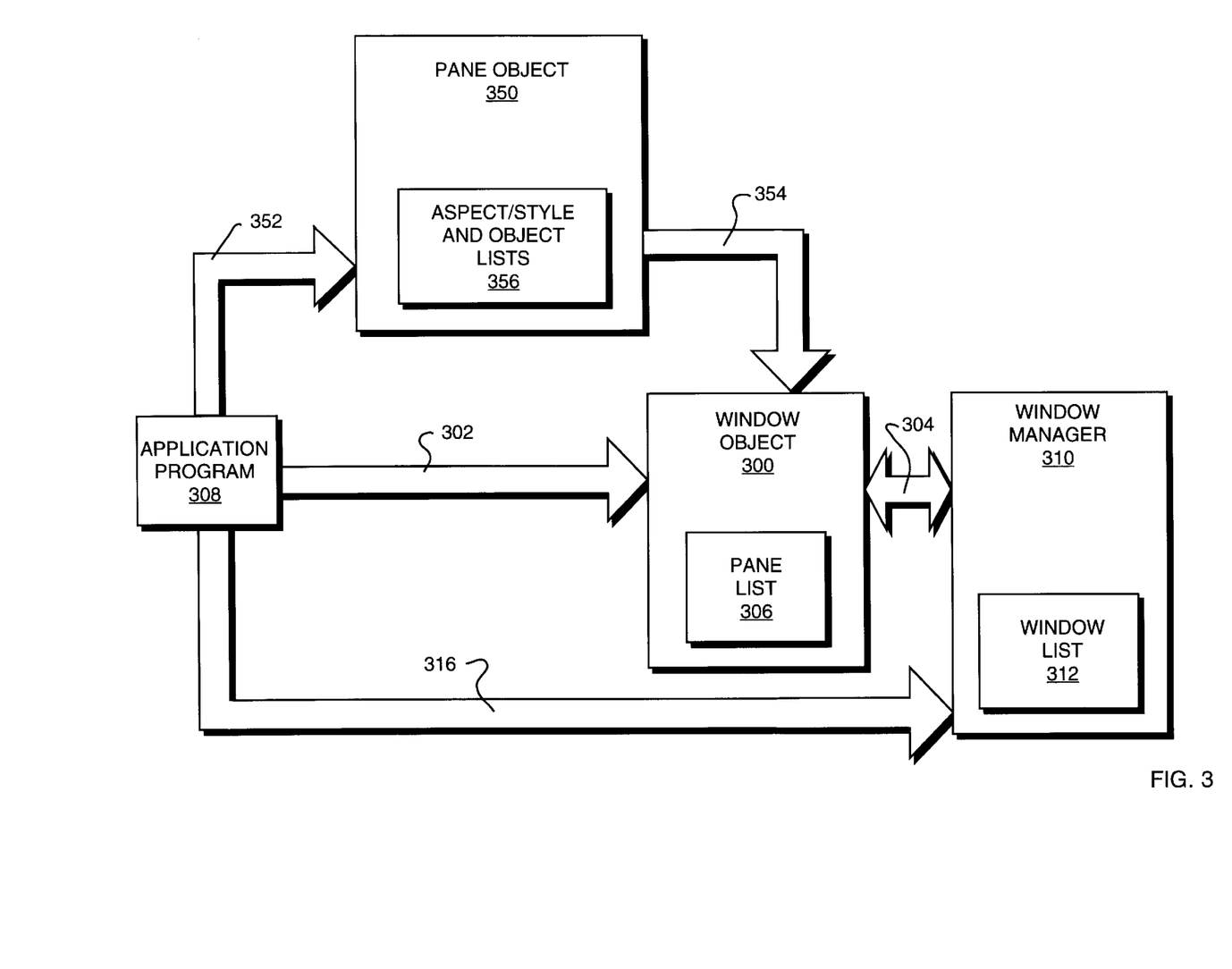
FIG. 3 shows the interaction between an application program and a window manager in accordance with the invention.

In general, an application program 308 interfaces with the window manager 310 by creating and manipulating objects. The window manager itself is an object which is created when the operating system is started. Specifically, the application program creates window objects 300 that cause the window manager to create associated windows on the display screen. This is shown schematically by arrow 302. In addition, the application program 308 creates individual pane objects 350 that are stored in each window object 300, as shown schematically by arrows 352 and 354.

Since many pane objects may be created in order to display many panes on the display screen, the window object 300 communicates with the window manager 310 by means of a sequence of drawing commands issued from the window object 300 to the window manager 310, as illustrated by arrow 304. The application 308 also communicates with the window manager 310 by sending commands to the manager 310, as indicated by arrow 316. The window manager 310 maintains a window list 312 that contains a list of each window currently in the system.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a conventional graphical user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending upon the level the system involved and the kind of problem to be solved. The types of frameworks range from high-level application frameworks that assist in developing a user interface, to lower-level frameworks that provide basic system software services such as communications, printing, file system support, graphics, etc. Commercial examples of application frameworks include MacApp (Apple), OWL (Borland), NeXT Step App Kit (NeXT) and Smalltalk-80 MVC (ParcPlace).

While the application framework approach utilizes all the principles of encapsulation, polymorphism and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedure calls.

In the same way that an application framework provides the developer with prefab functionality for an application program, a system framework, such as that included in the preferred embodiment, can provide a prefab functionality for system level services which developers can modify or override to create customized solutions, thereby avoiding the awkward procedure calls necessary with the prior art application frameworks programs. For example, consider a customizable browser framework which can provide the foundation for browsing and direct manipulation of objects. An application program developer who needed these capabilities would ordinarily have to write specific routines to provide them. To do this with a framework, the programmer only needs to supply the characteristics and behavior to the finished output, while the framework provides the actual routines which perform the tasks.

A preferred embodiment takes the concept of frameworks and applies it throughout the entire system, including the application and operating system. For the commercial or corporate developer or systems integrator, this means all of the advantages that have been illustrated for a framework, such as MacApp, can be leveraged not only at the system level for such services as printing, graphics, multi-media, file systems and I/O operations, but also at the application level, for things such as text and, as described herein, graphical user interfaces.

Referring again to FIG. 3, the window object 300 and the pane object 350 are elements of an improved graphical user interface having a customizable browser framework for greatly enhancing the ability of a user to navigate or browse through many different user visable objects stored in the memory 114. A user visible object is an object having a form of presentation on the display screen 135. The customizable browser framework classifies and organizes these user visable objects according to the semantics of a user's particular task.

Frequently, a user may want to view different types of information associated with these user visible objects. In accordance with the invention, the improved graphical user interface comprises novel aspect and style elements for controlling the type of information associated with objects displayed on a display screen of a computer system when browsing through these objects.

Specifically, the aspect element of the interface controls the type of information displayed for each object, i.e., its "aspect", on a pane; the aspect element further includes a default aspect that may be specified by the user to control a particular type of information about the object for display when invoking the browser. On the other hand, the style element controls the types of information displayed for all objects within that pane. In accordance with the invention, these novel user interface elements provide a customizable browser framework to the user.

Figure 4:
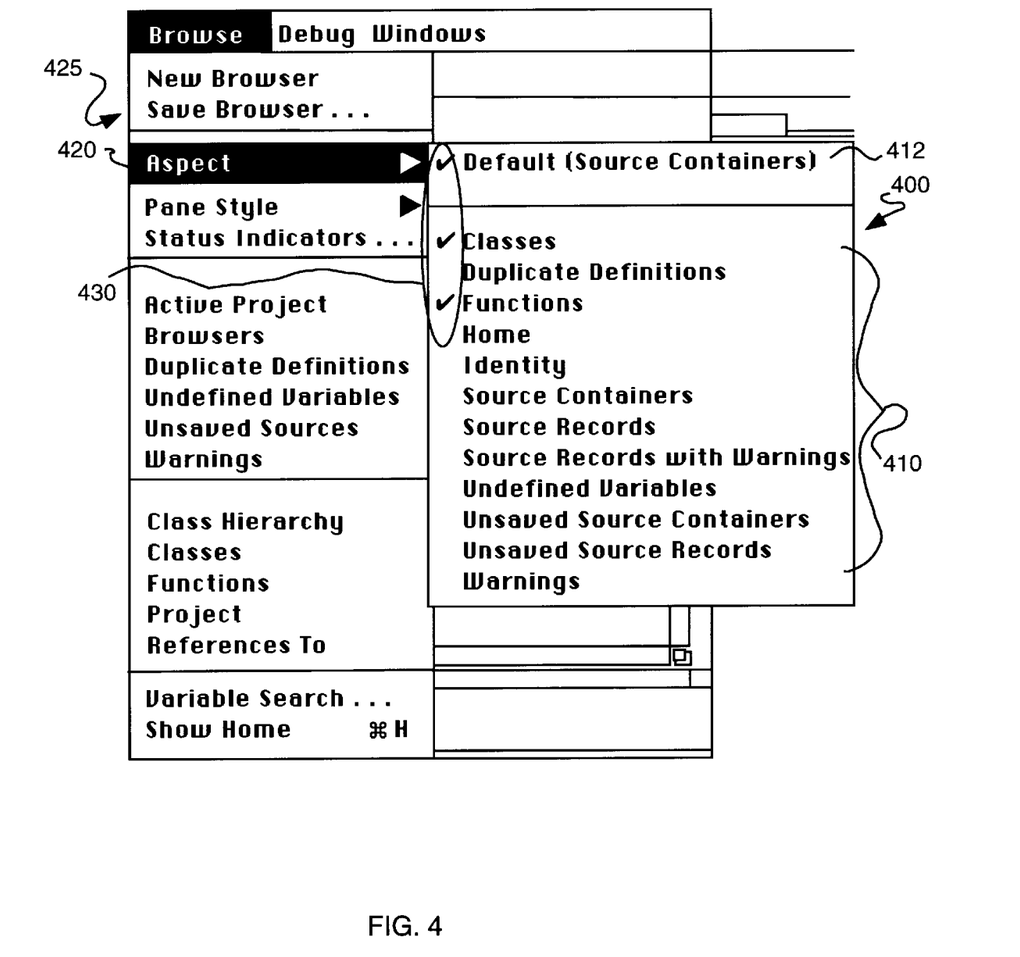
FIG. 4 shows entries of a browse menu, including an aspect group entry and its associated aspect menu for displaying a list of available aspect entries in accordance with the invention.

FIG. 4 shows a hierarchical aspect menu 400 for displaying a list of available aspect entries 410 in connection with the present invention. In the illustrative embodiment, the aspect menu 400 is a user interface element that may be accessed via an "aspect" group entry 420 of a browse menu 425. The browse menu is preferably a pull-down menu that is available from a menu bar 428. The aspect group entry 420 is active whenever there is an active pane in the window.

As noted, the aspect entries 410 displayed on the aspect menu 400 control the type of information associated with user visible objects that a user may want to examine when invoking the customizable browser framework. For example, the aspect parameters represented by these entries include classes of the selected object, its functions, its files and the definitions of the object. A user may override any aspect currently displayed in an active pane by selecting any of the available aspect entries on the list. Specifically, the user may preferably replace or substitute aspect entries by, e.g., "dragging" a cursor onto the entries with a mouse without holding down a modifier key, such as a Shift key. In contrast, the user may preferably add a new aspect by dragging the cursor with the modifier key pressed down. Of course, other mechanisms may be employed to select the aspect entries in accordance with the invention. The aspects that are currently displayed, or selected for display, are designated by check marks 430 or other similar inscription adjacent to the entries.

In addition to the available aspect entries 410, the aspect menu 400 includes a default entry section 412 for specifying a default aspect for display in the pane. This default entry section facilitates resetting of all the objects displayed in a pane to their default aspects specified by the selected style after the user has overridden that default. Overriding an aspect only changes the aspect shown directly beneath the selected object; all other displayed objects exhibit the default aspects for their styles unless they too are explicitly overridden by selecting a new value from the aspects menu. In accordance with the invention, the default entry section may be configured to display (i) a single aspect for all selected objects in the pane, (ii) multiple aspects for all selected objects in the pane or (iii) different aspects for some of the selected objects.

Figure 5:
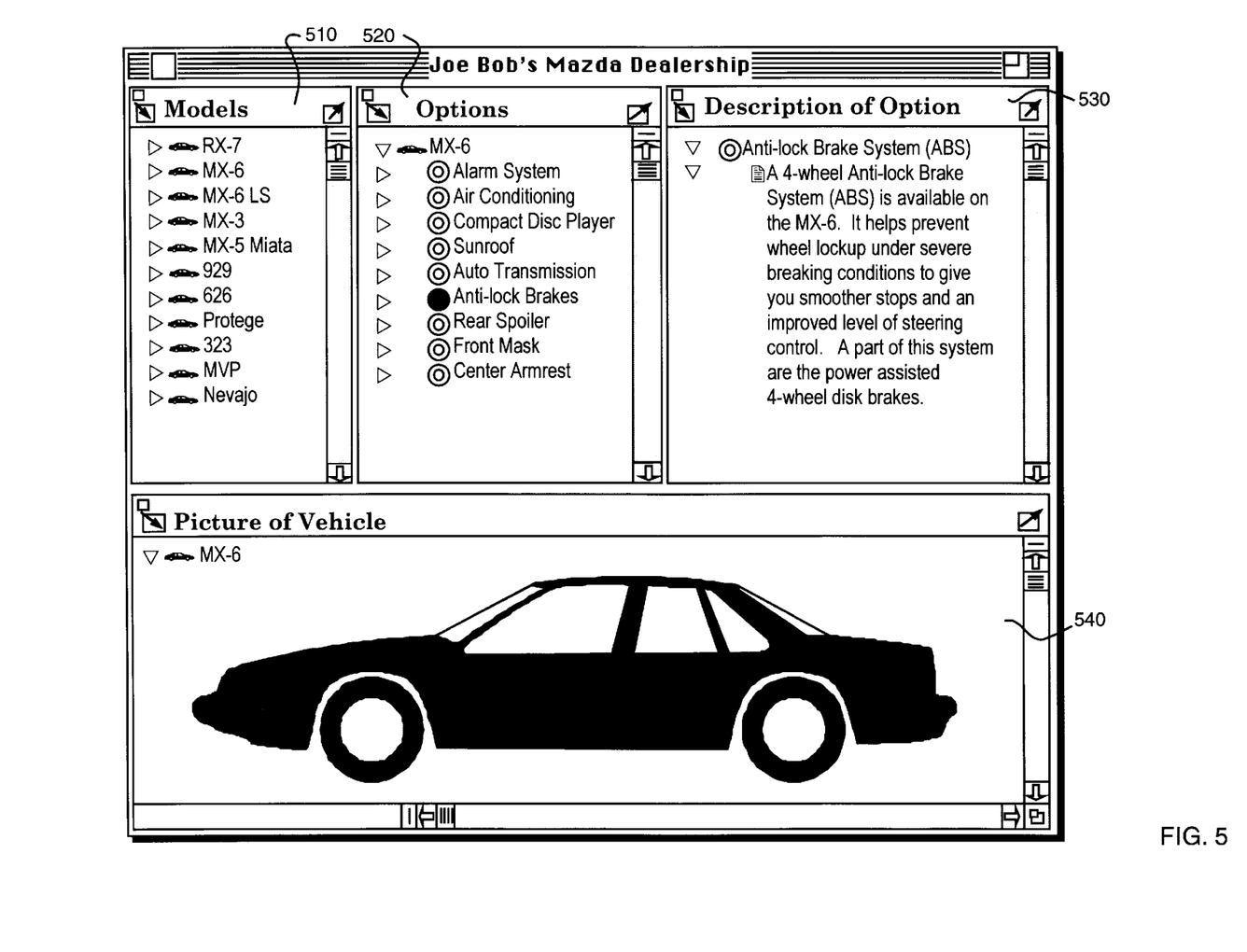
FIG. 5 illustrates panes of a window showing various aspects of an object in accordance with the invention.

FIG. 5 shows various aspects of a vehicle object displayed on a pane. These aspects provide links between an object and its types of information or other types of objects that the user wishes to examine when invoking the customizable browser framework. That is, the aspect user interface elements are completely independent of the types of information or the types of objects they return. These types of information may include any media or data type, such as sound, graphics, text and video, while the types of objects may include specific instances of these media or data types.

For example, FIG. 5 illustrates a window 500 displaying "Joe Bob's Mazda Dealership" and the panes 510–540 illustrate various aspects of selected object, such as a Mazda vehicle. Here, the aspects "Models", "Options", "Description of Option" and "Picture of Vehicle" provide links between an object <vehicle> and various media/data types associated with that object. Specifically, pane 510 lists the various models of Mazda vehicles that are available from Joe Bob's dealership; pane 520 shows the various options available with a particular model, such as the Mazda MX-6; pane 530 provides a textual description of an anti-lock brake system option; and pane 540 is a picture of the MX-6 car. In accordance with the invention, each media and data type displayed in FIG. 5 may be represented as an object, i.e., instance of that type.

Figure 6:
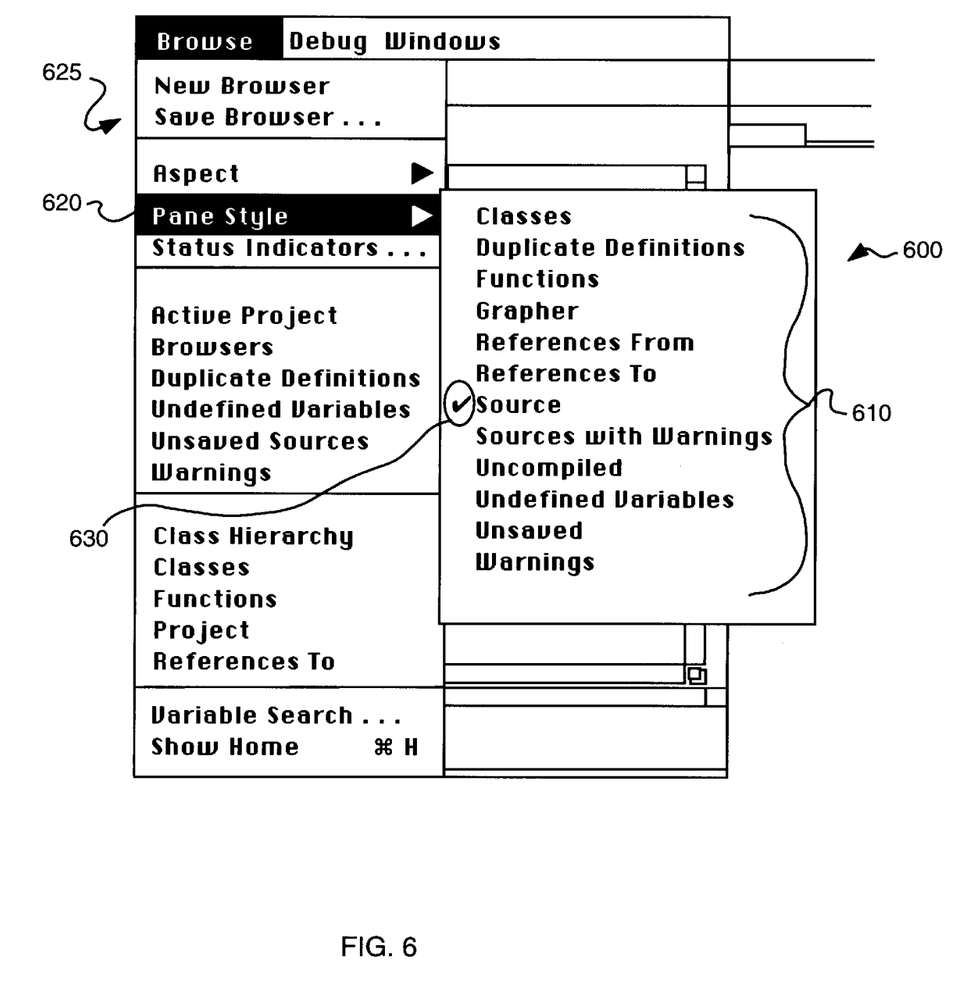
FIG. 6 shows entries of a browse menu, including a pane style group entry and its associated pane style menu for displaying a list of available style entries in accordance with the invention.

FIG. 6 shows a hierarchical pane style menu 600 for displaying a list of available style entries 610 in connection with the present invention. A "style" is preferably a collection of mappings between the objects and their default aspects; in general, it allows the user to define the type of information initially displayed for all objects "opened" on a pane when using the customizable browser framework. Accordingly, styles may be thought of as "default" aspects of the objects. The list of entries 610 displayed on the menu 600 function as "placeholders" for these default aspects.

As with the aspect menu 400 of FIG. 4, the pane style menu 600 may be accessed via a "pane style" group entry 620 of a pull-down browse menu 625 that is available from a menu bar 628. Again, the pane style group entry 620 is active whenever there is an active pane in the window. The pane style parameter that is currently displayed, or selected for display, is designated by check mark 630 adjacent to the entry.

Figure 7:
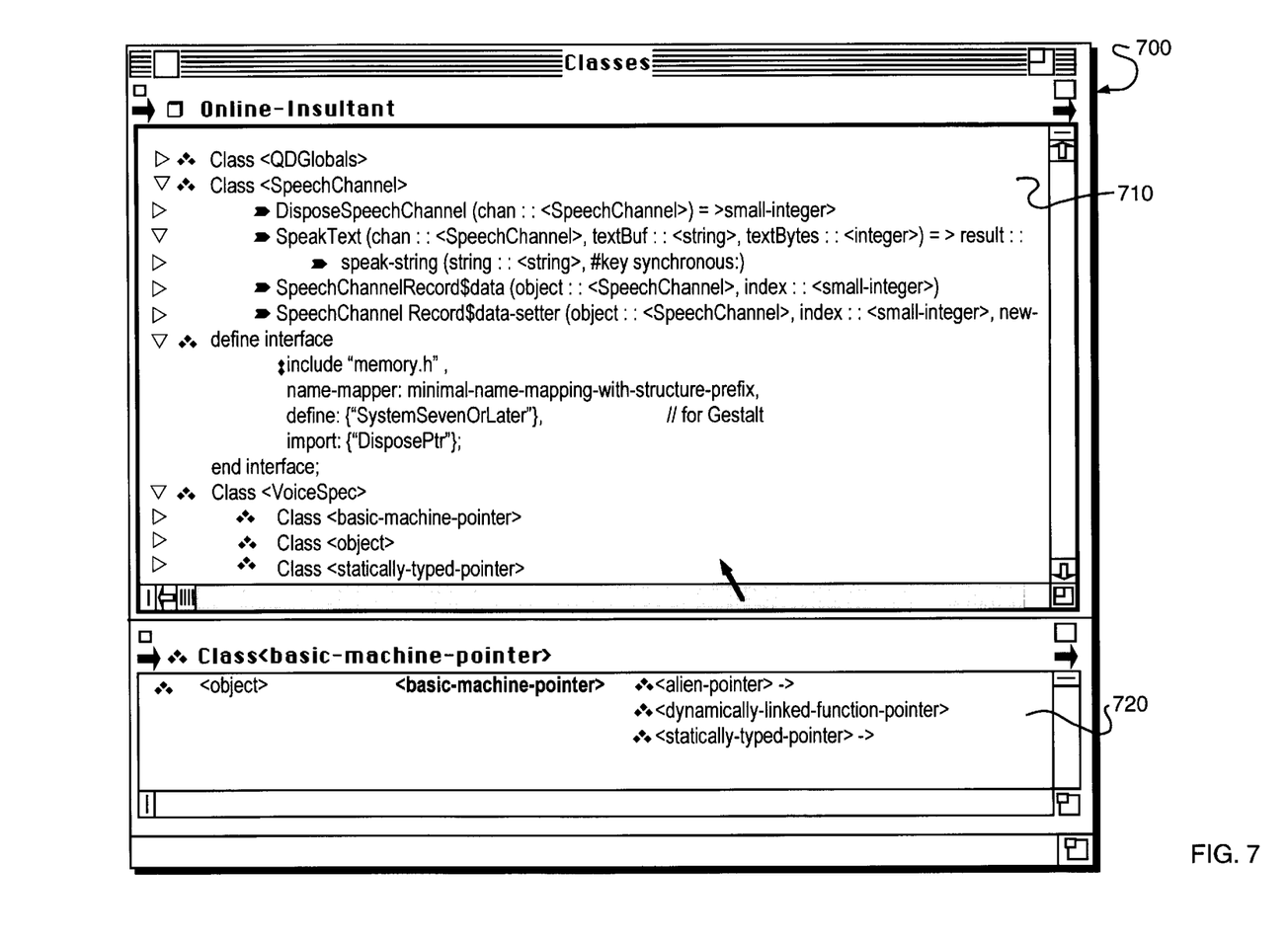
FIG. 7 illustrates various styles for displaying certain types of information about objects in accordance with the invention.

As noted, the user may configure the pane to any desired "style", thereby changing/overriding the objects and aspects appearing in that pane. The user may also change the type of information displayed for all the objects shown in the pane by selecting another style parameter from the pane style menu 600. Moreover, the style element may be utilized to display more than one type of information about a single type of object or it may be used to display different information about different types of objects. FIG. 7 shows various styles for displaying certain types of information about objects displayed on panes of a window 700.

Specifically, FIG. 7 shows two panes, a top pane 710 that shows a project "container" using a "classes" style and a bottom pane 720 that shows a "class hierarchy" style. For the top pane 710, the selected style shows any classes in the project container for other containers and subclasses of those classes. The subclasses aspect has been overridden for several of the objects displayed in the pane. In one case, the source code for the class is shown, while in another case, all methods defined for the class are shown. For this latter case, the method expands to show other methods that call this method.

In the bottom pane 720, superclasses and subclasses are shown by default, that is, as default aspects. Here, these types of information associated with the object class <basic-machine-pointer> are default aspects of those objects and, accordingly, the "style" of the pane displays the mapping between these objects and those default aspects. It should be noted that the information is displayed in a different layout—as a graph—to provide an illustrative example of a different way of viewing an object.

The selected aspect and style parameters are preferably determined on a pane-by-pane basis for the object displayed in that pane. Accordingly, and referring again to FIG. 3, each pane object 350 created by the application program 308 preferably has an internal data structure 356 containing a list of every aspect and style entry available from the respective aspect and style menus, together with the status of each entry on list, i.e., selected or unselected. In addition, each window object 300 contains a list of panes 306 and each pane object 350 also contains a list of user visible objects in data structure 356. Specifically, each user visible object in list 356 has a data structure that specifies which aspects to display for that object. The state of each object displayed in the pane determines whether or not to draw each possible aspect/style parameter.

Figure 8:
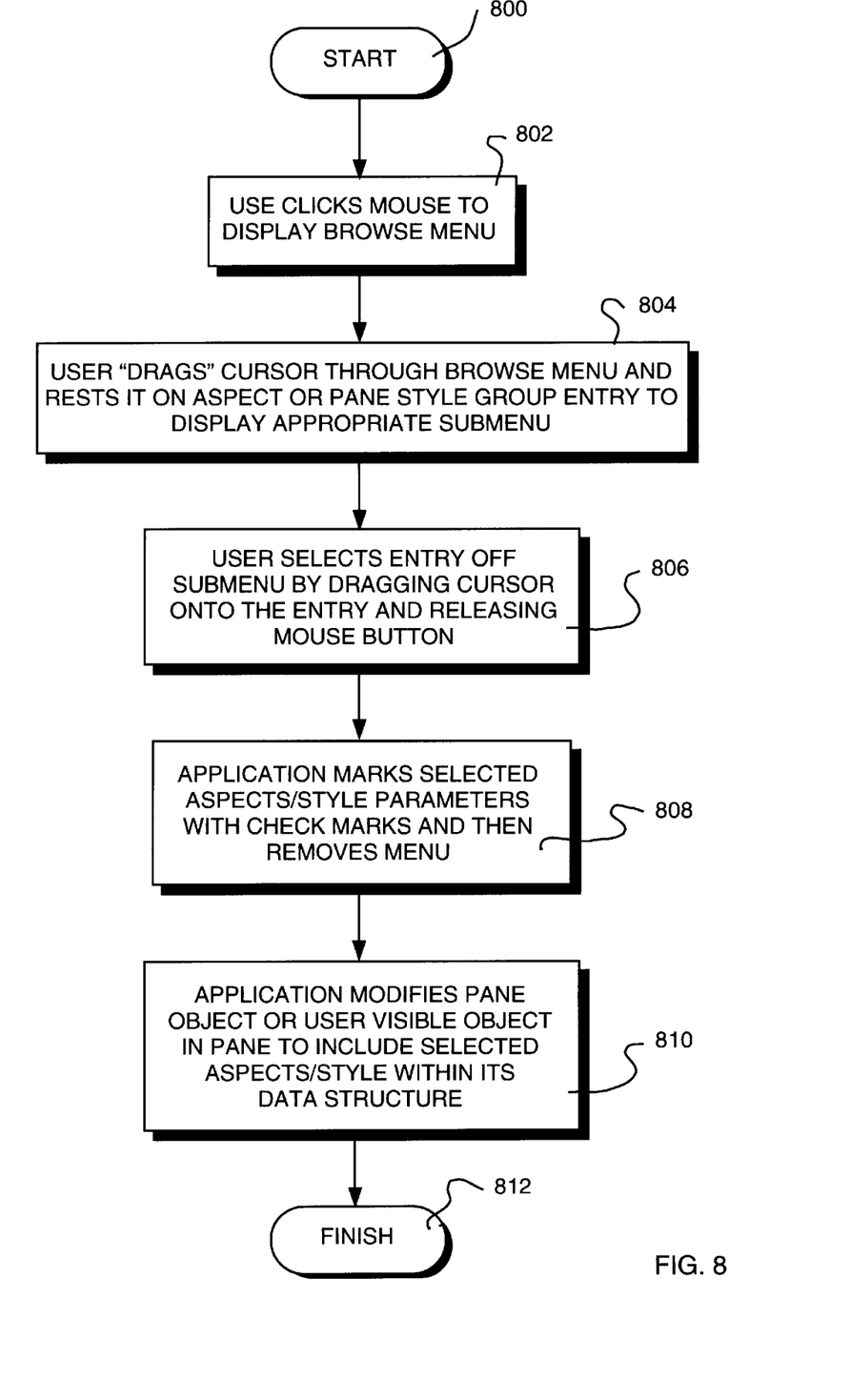
FIG. 8 is an illustrative flowchart of the sequence of steps involved in setting aspects of objects and styles of panes for display on a display screen.

FIGS. 1–7 will now be referenced in connection with flowchart of FIG. 8 to describe the sequence of steps involved in setting aspects of objects and styles of panes for display on a display screen. To set or change an aspect/pane style currently displayed for a user visible object, the sequence starts in Step 800 and proceeds to Step 802 where a user operates the mouse 130 (FIG. 1) to "point" the cursor 140 at the browse menu 425, 625 and then "clicks" the button 134 of the mouse to display that menu 425, 625.

As noted, the aspect and pane style menus 400, 600 are hierarchical menus having submenus attached to their respective group entries. In Step 804, the user manipulates the mouse to "drag" the cursor through the browse menu and rest it on either the aspect group entry 420 or the pane style group entry 620. The respective aspect submenu 400 or pane style submenu 600 is displayed on the screen.

These menus 400, 600 are also known as "drag-select" type submenus that allow the user to select an entry off the submenus by holding down the button 134 of mouse 130 while dragging the cursor 140 onto the desired entry and then releasing the mouse button, as indicated in Step 806. In Step 808, the application program 308 preferably marks the aspect/pane style parameters selected for display with check marks adjacent their entries on the menus and then removes the menus. The application 308 then modifies a pane object 350 or a user visible object in the pane to include the different aspect/style parameters within the contents of the data structure 356, as indicated in Step 810. The routine then finishes in Step 812.

As noted, the aspects displayed for a particular object and the pane style utilized for a particular pane are preferably determined on a pane-by-pane basis; accordingly, the selection of aspect/style parameters made by the user will determine which aspects/styles are displayed for the currently selected user viable object(s) in the currently active pane.

Figure 9:
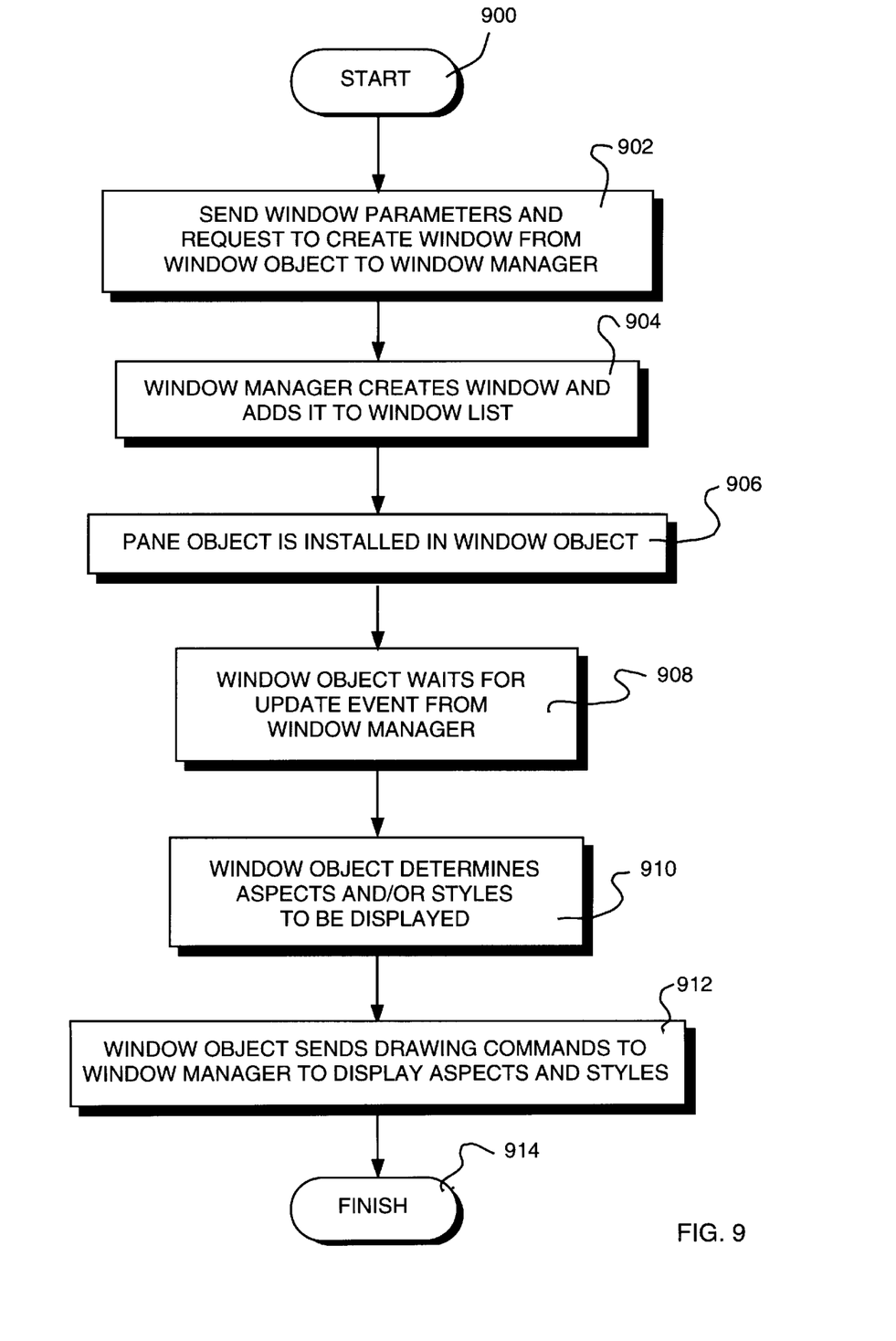
FIG. 9 is an illustrative flowchart of the sequence of steps used to display a window and associated panes, the panes displaying aspects and styles of objects in accordance with the invention.

As also noted, a window object and a pane object interact with the window manager to provide various window management functions, such as creating a window and its panes. An illustrative routine used by the application program to display a window and its associated panes, the latter of which display aspects and styles of objects, is shown in the flowchart of FIG. 9. The routine starts in Step 900 and proceeds to Step 902 in which the parameters defining the window, e.g., its size and interface elements, together with a request to create a new window, are sent (illustrated as arrow 304 in FIG. 3) from the window object to the window manager. In response to this request, the window manager creates a window (Step 904) and adds the new window to the window list 310. The list of created windows allows the window manager to keep track of the locations and sizes of the window which must be drawn and redrawn as windows are created and deleted in connection with elements of the improved graphical user interface of the present invention.

In Step 906, a pane object 350 is installed in the window object 300 and, in Step 908, the window object waits for an update event from the window manager indicating that the window and pane need to be drawn. The window manager generates such update events to coordinate the display of the windows and panes. Upon receiving the update event, the window object, in Step 910, determines which aspect and style parameters should be shown for each object of the list 356 stored in the pane object and, in Step 912, the window object sends appropriate drawing commands to the window manager to display those aspects and styles. The routine then finishes in Step 914.

An advantage of the present invention is that it allows a user, such as a programmer, to leverage relationships between elements of a program using the customizable browser framework and, thus, establish paths for investigating the contents of those elements in a sensible manner. For example, the programmer can configure the tools of the invention to view various objects of a program as a tree of related classes, protocols, or definitions and comments, thereby enabling the user to examine these "aspects" of the objects, one level at a time, throughout the tree.

While there has been shown and described an illustrative embodiment for controlling the type of information displayed for objects in a pane using novel aspect and style user interface elements, it is to be understood that various other adaptations and modifications may be made within the spirit and scope of the invention. For example, the description above identified pull-down, hierarchical menus as a means for setting the aspect and pane style elements of the invention. However, the invention is also applicable to pop-up style hierarchical menus as a means for setting these elements. In either case, the aspect elements described herein may be used in a "drag-drop" metaphor to edit the display of information relating to an object. According to this metaphor, a user may merely "drag" a selected aspect parameter (from either the pull-down or pop-up menus) to the appropriate displayed object and "drop" it under that object to display the type of information represented by that aspect.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An improved graphical user interface for enhancing the ability of a user to browse objects accessible from a computer system, said computer system including a memory for storing the objects, a display monitor for displaying a cursor on a display screen, and a device for manipulating said cursor by a user, said interface comprising:

a window of said screen, said window configured for apportionment into at least one pane for displaying said objects stored in said memory; and means for controlling information associated with said objects displayed on said pane in response to the user manipulating said cursor when browsing said displayed objects, said controlling means comprising:

a first interface element displayed on the display screen for linking information types and/or object types so as to specify the type of information displayed for each of said objects displayed on said pane, and a second interface element displayed on the display screen for selecting linked information types and/or objects types so as to vary the types of information initially displayed for all of said objects on said pane.

2. The improved graphical user interface of claim 1 wherein said first interface element is an aspect element that includes a default aspect parameter to control a particular type of information associated with said each object for display when browsing said each object.

3. The improved graphical user interface of claim 2 further comprising means for setting said aspect element to display the type of information for said each object displayed on said pane.

4. The improved graphical user interface of claim 3 wherein said aspect setting means comprises an aspect menu element displayed on said display screen, the user manipulating said cursor controlled device to select one or more parameter entries displayed on said aspect menu element.

5. An improved graphical user interface of claim 2 wherein said second interface element is a style element for providing a collection of mappings between all of said objects displayed in said pane and said default aspect parameters of said objects.

6. The improved graphical user interface of claim 5 further comprising means for setting said style element to display the types of information for all of said objects initially displayed on said pane.

7. The improved graphical user interface of claim 6 wherein said style setting means comprises a pane style menu element displayed on said display screen, the user manipulating said cursor controlled device to select one or more parameter entries displayed on said pane style menu element.

8. A computer system having an improved graphical user interface for enhancing the ability of a user to browse user visible objects stored in a memory of said computer, said computer including a display monitor for displaying a cursor on a display screen, and a device for manipulating said cursor by a user, said computer system comprising:

a processor;

an operating system cooperating with said processor to control said display screen;

a window manager object created by said operating system, said window manager object drawing a window for displaying a pane on said display screen;

an application program for generating said user visible objects for display on said pane; and user interface element means for linking information types and/or object types that specify the type of information associated with said user visible objects displayed on said pane in response to the user manipulating said cursor when browsing said user visible objects stored in said memory.

9. The computer system of claim 8 wherein said user interface element means comprises:

an aspect element for providing the links between each of said user visible objects and one of the types of information and other types of user visible objects displayed on said pane for said each user visible object, said aspect element including a default aspect parameter to control a particular type of information associated with said each user visible object; and a style element for providing a mapping between said user visible objects displayed on said pane and said default aspect parameter of said user visible objects.

10. The computer system of claim 9 wherein said user interface element means further comprises:

an aspect menu element displayed on said display screen for setting said aspect element in response to the user manipulating said cursor controlled device to select one or more parameter entries displayed on said aspect menu element; and a pane style menu element displayed on said display screen for setting said style element in response the user manipulating said cursor controlled device to select one or more parameter entries displayed on said pane style menu element.

11. The computer system of claim 10 further comprising a window object created by said application program, said window object communicating with said window manager object by issuing a sequence of drawing commands to display said pane.

12. The computer system of claim 11 further comprising a pane object created by said application program and stored in said window object, said pane object having an internal data structure containing a list of said selected aspect and style parameter entries.

13. A method for enhancing the ability of a user to browse user visible objects stored in a memory of a computer system having an improved graphical user interface, said computer including a display monitor for displaying a cursor on a display screen, and a device for manipulating said cursor by a user, said method comprising the steps of:

creating a window manager object from an operating system of said computer;

drawing a window for displaying a pane on said display screen using said window manager object;

generating said user visible objects for display on said pane with an application program;

providing one or more user interface menus for display on the display screen the one or more user interface menus including a plurality of aspect and style parameters; and selecting one or more aspect and style parameters from the user interface menus of said improved graphical user interface in response to the user manipulating said cursor, said one or more aspect and style parameters linking information types and/or object types that specify the type of information associated with said user visible objects displayed on said pane when browsing said user visible objects stored in said memory.

14. The method of claim 13 wherein said step of selecting comprises the steps of:

providing links between each of said user visible objects and one of the types of information and other types of user visible objects displayed on said pane for said each user visible object using said aspect parameters; and providing a collection of mappings between said user visible objects displayed on said pane and default aspect parameters of said user visible objects using said style parameters.

15. The method of claim 14 further comprising the steps of:

creating a window object from said application program;

issuing a sequence of drawing commands from said window object to said window manager object; and displaying said pane in response to said drawing commands.

16. The method of claim 15 further comprising the steps of:

creating a pane object from said application program;

storing said selected aspect and style parameters in a list of an internal data structure of said pane object;

storing said pane object in said window object; and sending said aspect and style parameters to said window manager object when displaying said pane.

* * * * *